(12) United States Patent
Tanishima et al.

(10) Patent No.: US 9,102,327 B2
(45) Date of Patent: Aug. 11, 2015

(54) ENGINE START CONTROL DEVICE FOR HYBRID ELECTRIC VEHICLE (75) Inventors: Kaori Tanishima, Isehara (JP); Hiroaki Kawamura, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 86 days.

(21) Appl. No.: 13/881,445

(22) PCT Filed: Oct. 5, 2011

(86) PCT No.: PCT/JP2011/072984
§ 371 (c)(1),
(2), (4) Date: Apr. 25, 2013

(87) PCT Pub. No.: WO2012/056857
PCT Pub. Date: May 3, 2012

(65) Prior Publication Data
US 2013/0211654 A1 Aug. 15, 2013

(30) Foreign Application Priority Data
Oct. 26, 2010 (JP) .................................. 2010-239410

(51) Int. Cl.
| | |
|---|---|
| B60W 20/00 | (2006.01) |
| B60K 6/48 | (2007.10) |
| B60K 6/547 | (2007.10) |
| B60W 10/02 | (2006.01) |
| B60W 10/08 | (2006.01) |
| B60W 30/192 | (2012.01) |
| F02D 29/02 | (2006.01) |
| F02N 5/04 | (2006.01) |
| F02N 11/00 | (2006.01) |
| F02N 11/08 | (2006.01) |
| B60L 3/00 | (2006.01) |
| B60L 11/14 | (2006.01) |
| B60L 15/20 | (2006.01) |
| F02N 11/04 | (2006.01) |
| F02N 15/02 | (2006.01) |
| F02D 41/30 | (2006.01) |

(52) U.S. Cl.
CPC ............... *B60W 20/40* (2013.01); *B60K 6/48* (2013.01); *B60K 6/547* (2013.01); *B60L 3/0046* (2013.01); *B60L 3/0061* (2013.01); *B60L 11/14* (2013.01); *B60L 15/2009* (2013.01); *B60W 10/02* (2013.01); *B60W 10/08* (2013.01); *B60W 20/00* (2013.01); *B60W 30/192* (2013.01); *F02D 29/02* (2013.01); *F02N 5/04* (2013.01); *F02N 11/00* (2013.01); *F02N 11/04* (2013.01); *F02N 11/0814* (2013.01); *F02N 11/0822* (2013.01); *F02N 15/025* (2013.01); *B60K 2006/4825* (2013.01); *B60L 2210/40* (2013.01); *B60L 2220/14* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/486* (2013.01); *B60L 2240/507* (2013.01); *B60L 2240/545* (2013.01); *B60L 2270/145* (2013.01); *B60W 2600/00* (2013.01); *B60W 2710/027* (2013.01); *F02D 41/307* (2013.01); *F02N 2200/101* (2013.01); *F02N 2300/2002* (2013.01); *F16D 2500/1066* (2013.01); *F16D 2500/3065* (2013.01); *F16D 2500/3067* (2013.01); *Y02T 10/48* (2013.01); *Y02T 10/6221* (2013.01); *Y02T 10/6252* (2013.01); *Y02T 10/642* (2013.01); *Y02T 10/70* (2013.01); *Y02T 10/7077* (2013.01); *Y02T 10/7241* (2013.01); *Y02T 10/7275* (2013.01); *Y10S 903/93* (2013.01)

(58) Field of Classification Search
CPC ..... B60W 10/02; B60W 10/06; B60W 10/08; B60W 20/00; B60W 2540/10; B60W 30/18027; B60W 2710/083; B60W 20/40; B60W 2710/025; B60W 2510/083; B60W 30/19; B60W 2520/04; B60W 2710/027; B60W 2710/0666; B60W 30/192; B60W 2510/0657; B60W 10/26; B60W 20/10;

B60W 2510/0208; B60W 2510/105; B60W 2540/106; B60W 2600/00; B60W 2710/0661; B60L 2240/423; B60L 15/2054; B60L 2240/443; B60L 15/2009; B60L 3/0046; B60L 3/0061; B60L 11/14; B60L 2210/40; B60L 2220/14; B60L 2240/12; B60L 2240/36; B60L 2240/421; B60L 2240/425; B60L 2240/441; B60L 2240/445; B60L 2240/486; B60L 2240/507; B60L 2240/545; B60L 2270/145; B60K 6/48; B60K 6/387; B60K 6/547; B60K 2006/4825; F02D 29/02; F02D 41/307; F02N 5/04; F02N 11/00; F02N 15/025; F02N 11/04; F02N 11/0814; F02N 11/0822; F02N 2200/101; F02N 2300/2002; F16D 2500/1066; F16D 2500/3065; F16D 2500/3067; Y02T 10/48; Y02T 10/642; Y02T 10/6221; Y02T 10/6252; Y02T 10/6286; Y02T 10/7077; Y02T 10/7241; Y10S 903/93

See application file for complete search history.

(56) References Cited

U.S. PATENT DOCUMENTS

| | | | | |
|---|---|---|---|---|
| 5,844,342 | A * | 12/1998 | Miyatani et al. | 310/114 |
| 6,083,139 | A * | 7/2000 | Deguchi et al. | 477/5 |
| 6,306,056 | B1 * | 10/2001 | Moore | 475/5 |
| 6,602,164 | B2 * | 8/2003 | Yoshiaki et al. | 477/107 |
| 6,827,167 | B2 * | 12/2004 | Cikanek et al. | 180/65.6 |
| 6,905,438 | B2 * | 6/2005 | Suzuki et al. | 477/5 |
| 7,089,095 | B2 * | 8/2006 | Takami et al. | 701/22 |
| 7,878,281 | B2 * | 2/2011 | Tanishima | 180/65.265 |
| 2002/0019290 | A1 * | 2/2002 | Mesiti et al. | 477/5 |
| 2005/0054479 | A1 * | 3/2005 | Masterson et al. | 477/3 |
| 2005/0101433 | A1 * | 5/2005 | Joe | 477/5 |
| 2007/0227790 | A1 * | 10/2007 | Tanishima | 180/65.2 |
| 2007/0227791 | A1 * | 10/2007 | Ueno | 180/65.2 |
| 2011/0070999 | A1 * | 3/2011 | Soliman et al. | 477/3 |

FOREIGN PATENT DOCUMENTS

| | | |
|---|---|---|
| JP | 2008-179283 A | 8/2008 |
| JP | 2010-036847 A | 2/2010 |
| JP | 2010-076625 A | 4/2010 |
| JP | 2010-188785 A | 9/2010 |

OTHER PUBLICATIONS

Japanese Office Action, Dec. 2, 2014, 3 pages.

* cited by examiner

*Primary Examiner* — Khoi Tran
*Assistant Examiner* — Bao Long T Nguyen
(74) *Attorney, Agent, or Firm* — Foley & Lardner LLP

(57) ABSTRACT

An engine and a motor are provided. The engine and the motor are connected to each other through a first clutch whose transmitted torque capacity is adjustable. The engine is started by applying the first clutch and cranking the engine with a driving effort of the motor. A first start mode and a second start mode are employed. The first start mode is a mode in which the engine is started from rest in response to driver's accelerator operation. The second start mode is a mode in which the engine is started from rest in response to a factor other than driver's accelerator operation. The transmitted torque capacity of the first clutch during cranking of the engine is set smaller when in the second start mode than when in the first start mode.

1 Claim, 6 Drawing Sheets

ENGINE START CONTROL DEVICE FOR HYBRID ELECTRIC VEHICLE

TECHNICAL FIELD

The present invention relates to engine start control for a hybrid electric vehicle provided with an engine and a motor as drive sources, and a clutch between the engine and the motor.

BACKGROUND ART

For example, a patent document 1 discloses a hybrid electric vehicle provided with an engine and a motor-generator as drive sources, wherein a first clutch whose transmitted torque capacity is adjustable is disposed between the engine and the motor-generator, and wherein a second clutch whose transmitted torque capacity is adjustable is disposed between the motor-generator and driving wheels of the vehicle.

According to patent document 1, the engine is started by applying the first clutch in response to a request issued when the vehicle is running while being driven only by the motor-generator with the engine stopped, wherein the request is a request for shifting to an operating mode in which the engine is started and the vehicle runs while being driven by both of the engine and the motor-generator. Patent document 1 discloses a technique that when a battery for supplying electric power to the motor-generator can output a sufficient power at such engine start during vehicle running, namely, when a maximum possible output torque of the motor-generator is sufficient to cover vehicle-driving torque and engine-starting torque, then the transmitted torque capacity of the first clutch is increased, and a target torque of the motor-generator is increased with increase of the transmitted torque capacity of the first clutch, thereby increasing a cranking torque transmitted from the motor-generator to the engine through the first clutch, and quickly completing the engine start.

However, in patent document 1, control of the transmitted torque capacity of the first clutch when the engine is started from rest while the vehicle is running, is the same in situations where the engine is started in response to driver's accelerator operation as in situations where the engine is started in response to a factor other than driver's accelerator operation.

Namely, the control of the transmitted torque capacity of the first clutch during engine cranking is not based on whether the engine start is in response to driver's accelerator operation, i.e. in response to a driver's request, or in response to a factor other than driver's accelerator operation, i.e. not based on driver's intention.

Accordingly, when the engine is started from rest in response to a factor other than driver's accelerator operation, a driver tends to sensitively feel shocks caused by torque fluctuation resulting from application of the first clutch, because the engine start is not intended by the driver.

PRIOR ART DOCUMENT(S)

Patent Document(s)

Patent Document 1: JP 2008-179283 A

SUMMARY OF THE INVENTION

According to the present invention, an engine start control apparatus is applied to a hybrid electric vehicle, wherein: the hybrid electric vehicle is provided with an engine and a motor; the engine and the motor are connected to each other through a first clutch whose transmitted torque capacity is adjustable; and the hybrid electric vehicle starts the engine by applying the first clutch and cranking the engine with a driving effort of the motor.

The engine start control apparatus employs a first start mode and a second start mode; the first start mode is a mode in which the engine start control apparatus starts the engine from rest in response to driver's accelerator operation; the second start mode is a mode in which the engine start control apparatus starts the engine from rest in response to a factor other than driver's accelerator operation; and the engine start control apparatus sets smaller the transmitted torque capacity of the first clutch during cranking of the engine when in the second start mode than when in the first start mode.

According to the present invention, it is possible to suppress shocks caused by torque fluctuation resulting from application of the first clutch when in the second start mode. Namely, when the engine is started based on no driver's intention, it is possible to suppress torque fluctuation resulting from application of the first clutch, and thereby prevent a driver from feeling uncomfortable with shocks caused by the torque fluctuation.

MODE(S) FOR CARRYING OUT THE INVENTION

The following describes an embodiment of the present invention in detail with reference to the drawings.

Figure 1:
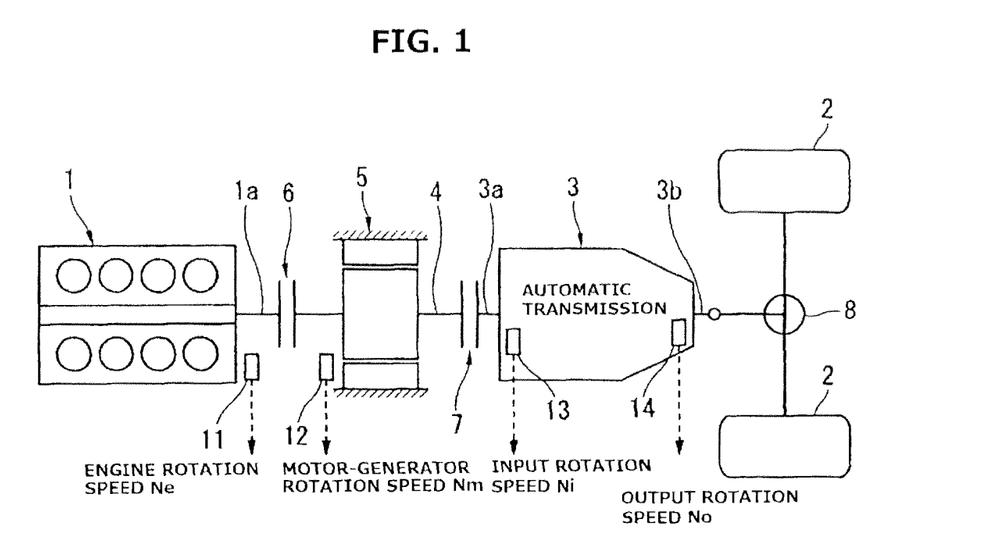
FIG. 1 is a diagram illustrating configuration of a powertrain of a hybrid electric vehicle according to an embodiment to which the present invention is applied.

First, the following describes basic configuration of a hybrid electric vehicle to which the present invention is applied. FIG. 1 shows a powertrain of a hybrid electric vehicle according to the embodiment of the present invention which is of front engine rear wheel drive (FR) type, wherein 1 denotes an engine, and 2 denotes a driving road wheel (rear wheel). However, the present invention is not limited to FR type, but may be applied to another type such as FF type or RR type.

In the powertrain of the hybrid electric vehicle shown in FIG. 1, an automatic transmission 3 is arranged in tandem behind engine 1 in a vehicle longitudinal direction, as in typical rear wheel drive vehicles. A shaft 4 for transmitting rotation from engine 1 (crankshaft 1a) to an input shaft 3a of automatic transmission 3 is provided integrally with a motor-generator 5.

Motor-generator 5 is a synchronous motor with a rotor made of a permanent magnet, and is configured to serve as a motor (i.e. power running), and also serves as a generator (i.e. regenerative running), and is located between engine 1 and automatic transmission 3 as described above. Between motor-generator 5 and engine 1, specifically, between shaft 4 and engine crankshaft 1a, is provided a first clutch 6 which selectively connects and disconnects engine 1 and motor-generator 5 to and from each other.

First clutch 6 is configured to continuously vary its transmitted torque capacity. For example, first clutch 6 is a normally closed dry-type single plate clutch or wet-type multi-plate clutch whose transmitted torque capacity can be varied by continuously controlling clutch operation hydraulic pressure with a proportional solenoid valve and the like.

Between motor-generator 5 and driving road wheels 2, specifically, between shaft 4 and transmission input shaft 3a, is provided a second clutch 7 which selectively connects and disconnects motor-generator 5 and automatic transmission 3 to and from each other.

Similar to first clutch 6, second clutch 7 is configured to continuously vary its transmitted torque capacity. For example, second clutch 7 is a dry-type single plate clutch or wet-type multi-plate clutch whose transmitted torque capacity can be varied by continuously controlling clutch operation hydraulic pressure with a proportional solenoid valve and the like.

Automatic transmission 3 obtains gear positions such as seven forward gear positions and one reverse gear position by combinations of application or release of a plurality of friction members (clutches, brakes, etc.) by selectively applying and releasing the plurality of friction members. Accordingly, automatic transmission 3 shifts rotation inputted from input shaft 3a by a gear ratio corresponding to a selected gear position. The output rotation is transmitted and distributed to left and right driving road wheels (rear wheels) 2 through a differential gear device 8. Automatic transmission 3 is not limited to the stepwise type describe above, but may be a continuously variable transmission. Automatic transmission 3 is provided with a P (Parking) range as a non-drive range, an N (Neutral) range, a D (Drive) range and an R (Reverse) range as drive ranges, which are selected by a driver through a select lever.

The powertrain described above employs an electric vehicle drive mode (EV mode) in which the vehicle is driven only by the power of motor-generator 5, and a hybrid drive mode (HEV mode) in which the vehicle is driven by both of engine 1 and motor-generator 5. When the load is low and the vehicle speed is low, for example, when the vehicle is started from stationary state, the EV mode is requested. In the EV mode, the power of engine 1 is not used, accordingly, engine 1 is maintained at rest, while first clutch 6 is released and second clutch 7 is applied, and automatic transmission 3 is set into a state allowing power transmission. Under this condition, the vehicle is driven only by motor-generator 5.

On the other hand, when the vehicle is running at high speed or running at high load, the HEV mode is requested. In the HEV mode, both of first clutch 6 and second clutch 7 are applied, and automatic transmission 3 is set into a state allowing power transmission. Under this condition, both of the output rotation from engine 1 and the output rotation from motor-generator 5 are inputted into transmission input shaft 3a, thus performing hybrid driving based on engine 1 and motor-generator 5.

Motor-generator 5 is capable of regenerating and recovering braking energy while the vehicle is being decelerated, and is capable of recovering excess energy of engine 1 into electric energy when in the HEV mode.

During transition from the EV mode to the HEV mode, first clutch 6 is applied, and the engine is started with the torque of motor-generator 5. At this moment, it is possible to perform smooth mode transition by slip application of first clutch 6 by variably controlling the transmitted torque capacity of first clutch 6.

Second clutch 7 functions as a start clutch. When the vehicle starts, the transmitted torque capacity of second clutch 7 is variably controlled to cause slip application of second clutch 7, thereby absorbing torque fluctuation and thereby achieving smooth vehicle start even with a powertrain provided with no torque converter.

Figure 2:
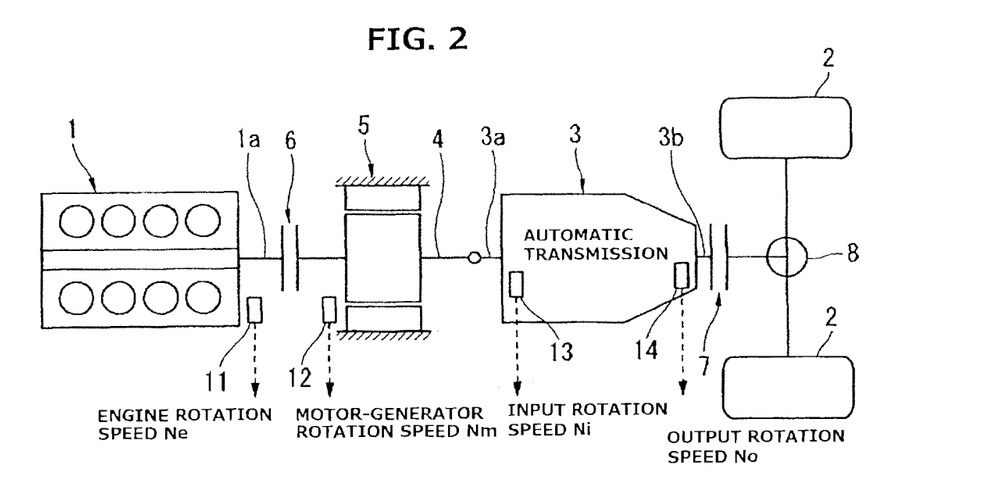
FIG. 2 is a diagram illustrating configuration of a powertrain of a hybrid electric vehicle according to a modified embodiment to which the present invention is applied.

Although second clutch 7 arranged between motor-generator 5 and driving road wheels 2 is disposed between motor-generator 5 and automatic transmission 3 in FIG. 1, second clutch 7 may be disposed between automatic transmission 3 and differential gear device 8 as in the embodiment shown in FIG. 2.

Figure 3:
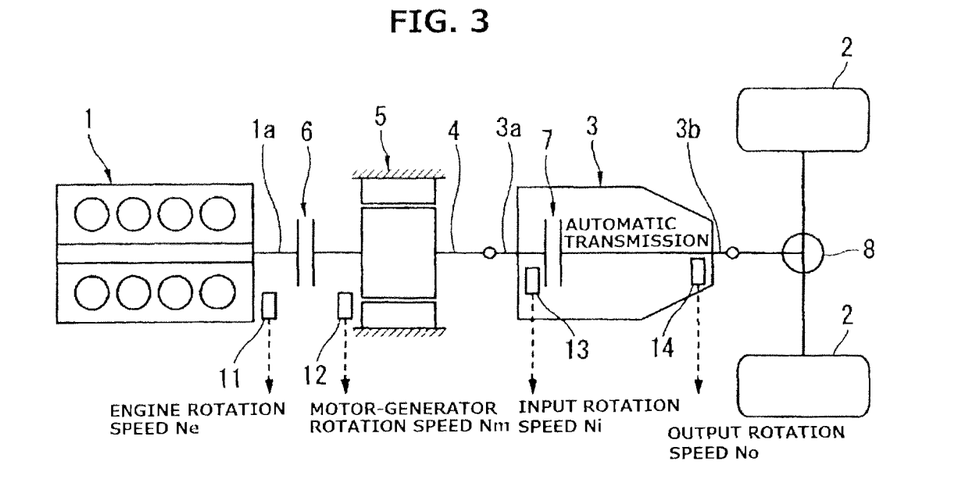
FIG. 3 is a diagram illustrating configuration of a powertrain of a hybrid electric vehicle according to a further modified embodiment to which the present invention is applied.

Although second clutch 7 is specially provided on the front side or back side of automatic transmission 3 in the embodiments of FIGS. 1 and 2, second clutch 7 may be implemented by an existing friction member for selection of a forward gear position or an existing friction member for selection of a reverse gear position in automatic transmission 3 as shown in FIG. 3. In this case, second clutch 7 is not limited to a single friction member, but may be a suitable combination of friction members corresponding to gear position.

Figure 4:
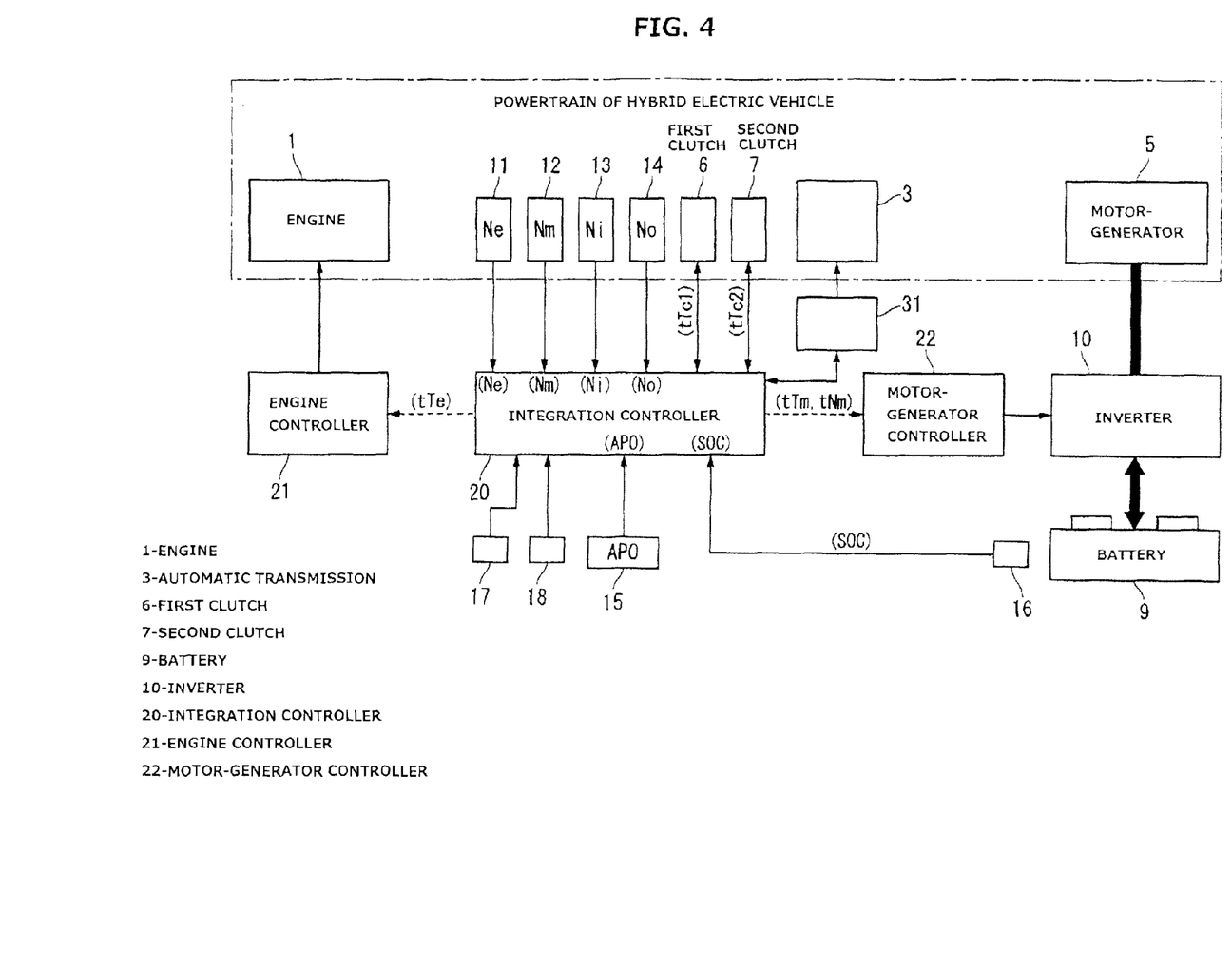
FIG. 4 is a block diagram showing a control system of the powertrain.

FIG. 4 shows a control system of the powertrain of the hybrid electric vehicle configured as shown in FIGS. 1 to 3.

This control system is provided with an integration controller 20 for integrally controlling an operating point of the powertrain. The operating point is defined by a target engine torque tTe, a target motor-generator torque tTm (or a target motor-generator rotation speed tNm), a target transmitted torque capacity tTc1 of first clutch 6, and a target transmitted torque capacity tTc2 of second clutch 7.

The control system includes: an engine rotation speed sensor 11 for sensing engine rotation speed Ne; a motor-generator rotation speed sensor 12 for sensing motor-generator rotation speed Nm; an input rotation speed sensor 13 for sensing transmission input rotation speed Ni; an output rotation speed sensor 14 for sensing transmission output rotation speed No; an accelerator opening sensor 15 for sensing an amount of depression of an accelerator pedal (accelerator opening APO) indicative of a state of requested load of engine 1; and a state-of-charge sensor 16 for sensing state-of-charge SOC of a battery 9 that stores electric energy for motor-generator 5. These sensing signals are inputted into integration controller 20, for determining the operating point described above. Moreover, sensing signals are inputted into integration controller 20 from various sensors such as a water temperature sensor 17 for sensing coolant temperature of engine 1, and an oil temperature sensor 18 for sensing oil temperature of automatic transmission 3.

For example, engine rotation speed sensor 11, motor-generator rotation speed sensor 12, input rotation speed sensor 13, and output rotation speed sensor 14 are arranged as shown in FIGS. 1 to 3.

Integration controller 20 selects a drive mode (EV mode or HEV mode) capable of achieving a driving force of the vehicle requested by the driver, and calculates target engine torque tTe, target motor-generator torque tTm (or target motor-generator rotation speed tNm), target first clutch transmitted torque capacity tTc1, and target second clutch transmitted torque capacity tTc2, based on accelerator opening APO, battery state-of-charge SOC, and transmission output rotation speed No (vehicle speed VSP) which are included in the input information described above.

The target engine torque tTe is informed to an engine controller 21. Engine controller 21 controls engine 1 in a manner to conform engine torque Te to target engine torque tTe. For example, engine 1 is a gasoline engine, and engine torque Te is controlled through its throttle valve.

On the other hand, target motor-generator torque tTm (or target motor-generator rotation speed tNm) is informed to a motor-generator controller 22. Motor-generator controller 22 controls motor-generator 5 through an inverter 10 in a manner to conform torque Tm (or rotation speed Nm) of motor-generator 5 to target motor-generator torque tTm (or target motor-generator rotation speed tNm).

Integration controller 20 supplies solenoid currents to application control solenoid valves (not shown) of first clutch 6 and second clutch 7, wherein the solenoid currents correspond to target first clutch transmitted torque capacity tTc1 and target second clutch transmitted torque capacity tTc2, respectively. Integration controller 20 thereby controls the state of application of first clutch 6 and the state of application of second clutch 7 individually in a manner to conform transmitted torque capacity Tc1 of first clutch 6 to target transmitted torque capacity tTc1, and conform transmitted torque capacity Tc2 of second clutch 7 to target second clutch transmitted torque capacity tTc2.

Integration controller 20 is connected also to an AT controller 31 that controls automatic transmission 3. AT controller 31 determines an optimal gear position based on the range position selected with the select lever or the like, vehicle speed VSP (transmission output rotation speed No), and accelerator opening APO, and performs a shift control by application and release of friction members in automatic transmission 3. The information indicative of various states of automatic transmission 3 is inputted into integration controller 20. In the case where second clutch 7 is constituted substantially by a friction member of automatic transmission 3 as shown in FIG. 3, second clutch 7 is controlled actually through AT controller 31.

The hybrid electric vehicle of this embodiment starts engine 1 from rest, when shifting from the EV mode to the HEV mode in response to a driver's request for acceleration, or when a predetermined request for engine start is issued when in EV mode as detailed below. During this kind of engine start, engine 1 is started in different start modes, namely, started in a first start mode when engine 1 is started from rest in response to driver's accelerator operation, and is started in a second start mode when engine 1 is started in response to a factor other than driver's accelerator operation (system-requested start).

Figure 5:
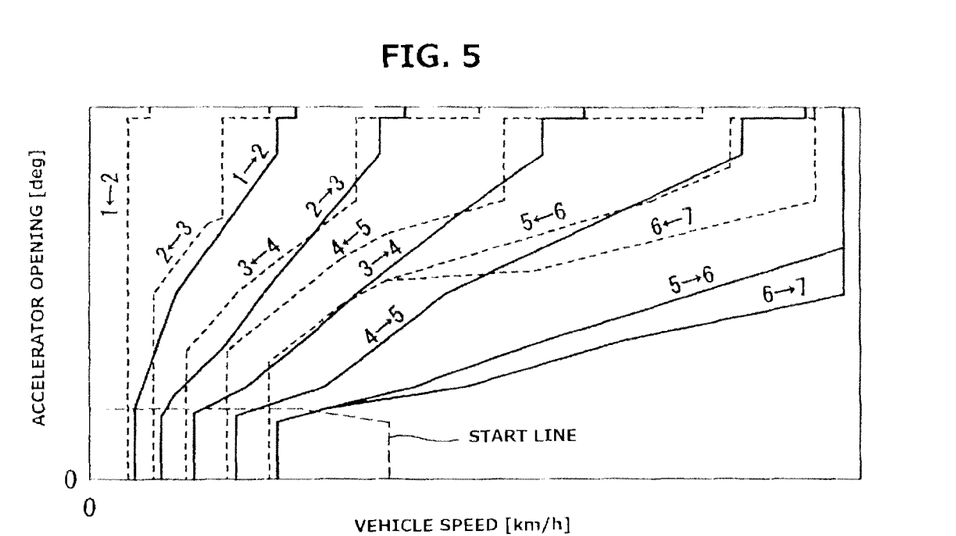
FIG. 5 is a diagram schematically illustrating a region for determining a first start mode.

For example, when the state of operation of the vehicle represented by accelerator opening and vehicle speed gets beyond a predetermined start line as shown in FIG. 5 in response to driver's accelerator operation, it is determined that the request for start of engine 1 belongs to the first start mode.

For example, when at least one of the following conditions is satisfied in response to a factor other than driver's accelerator operation while engine 1 is at rest, it is determined that the request for start of engine 1 belongs to the second start mode.

(1) Engine 1 is stated in the second start mode, when the oil temperature of automatic transmission 3 is higher than or equal to a predetermined temperature (115° C., for example).

(2) Engine 1 is stated in the second start mode, when the oil temperature of automatic transmission 3 is lower than or equal to a predetermined temperature (15° C., for example). This serves to prevent the oil temperature of automatic transmission 3 from falling excessively due to a long time idle stop, when the hybrid electric vehicle performs the so-called idle stop at intersections and the like.

(3) Engine 1 is stated in the second start mode, when the coolant temperature of engine 1 is higher than or equal to a predetermined temperature (120° C., for example).

(4) Engine 1 is stated in the second start mode, when the coolant temperature of engine 1 is lower than or equal to a predetermined temperature (40° C., for example). This serves to prevent the coolant temperature of engine 1 from falling excessively due to a long time idle stop, when the hybrid electric vehicle performs the so-called idle stop at intersections and the like.

(5) Engine 1 is stated in the second start mode, when a maximum possible torque outputted from motor-generator 5 is lower than or equal to a predetermined torque (100 Nm, for example). This is because if motor-generator 5 is overheated so that the maximum possible torque outputted from motor-generator 5 gets lower than the predetermined torque, there is a possibility that engine 1 cannot be thereafter started by motor-generator 5.

Figure 6:
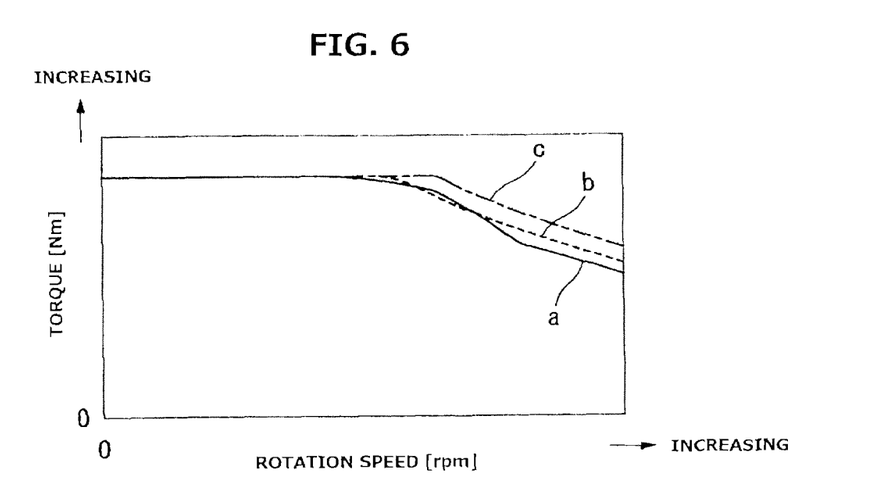
FIG. 6 is a diagram schematically illustrating characteristics of torque of a motor-generator with respect to variation of an output power of a battery.

(6) Engine 1 is stated in the second start mode, when a maximum possible power outputted by battery 9 gets lower than or equal to a predetermined power (20 kW, for example). When the maximum possible power outputted by battery 9 gets lower due to increase or decrease of the temperature of battery 9, the maximum possible torque outputted from motor-generator 5 gets lower as the rotation speed increases as shown in FIG. 6. Accordingly, when the maximum possible power outputted by battery 9 gets lower than or equal to the predetermined power, engine 1 is started in the second start mode, because it is possible that a region of torque that can be employed by motor-generator 5 gets smaller so that motor-generator 5 cannot start engine 1 thereafter. In FIG. 6, a solid line "a" indicates a case where the battery output is equal to 50 kW, and a dotted line "b" indicates a case where the battery output is equal to 54 kW, and an alternate long and short dash line "c" indicates a case where the battery output is equal to 60 kW.

(7) Engine 1 is stated in the second start mode, when the state-of-charge SOC of battery 9 is lower than or equal to a predetermined value (35%, for example). This serves to charge battery 9 in situations where the vehicle has run in the EV mode for a long time due to traffic jam or the like.

(8) Engine 1 is stated in the second start mode, when the vehicle speed is higher than or equal to a predetermined speed (100 km/h, for example). This is to start engine 1 before the rotation speed of motor-generator 5 gets high.

(9) Engine 1 is stated in the second start mode, when there is a request for engine start based on decrease of negative pressure of a negative pressure pump. This is to maintain negative pressure by operation of engine 1.

(10) Engine 1 is stated in the second start mode, when the hybrid electric vehicle performs the so-called idle stop at intersections and the like and a condition for idle stop inhibition is satisfied during idle stop.

(11) Engine 1 is stated in the second start mode, when the state-of-charge SOC of battery 9 gets higher than or equal to a predetermined value (65%, for example) while the vehicle is running on a descending slope. This is to use engine braking before battery 9 is fully charged and thereby regenerative braking is limited while the vehicle is running on the descending slope.

The conditions (1)-(11) are only examples of engine start request condition for selecting the second start mode. The engine start request condition for selecting the second start mode is not limited to the conditions (1)-(11).

When engine 1 is started in response to driver's accelerator operation, the driver has an intention to start the engine, so that the driver tends to feel more uncomfortable when a long time period has elapsed before engine 1 is started after accelerator operation of the driver, than when torque fluctuation is caused by application of first clutch 6. Namely, when engine 1 is started in response to driver's accelerator operation, it is desirable to variably control the transmitted torque capacity of first clutch 6 in a manner to allow quick start of engine 1.

On the other hand, when engine 1 is started in response to a factor other than driver's accelerator operation, the driver has no intention to start the engine, so that the driver tends to feel more uncomfortable about torque fluctuation resulting from application of first clutch 6 than about a time period until engine 1 is started. Namely, when engine 1 is started in response to a factor other than driver's accelerator operation, it is desirable to variably control the transmitted torque capacity of first clutch 6 in a manner to suppress torque fluctuation resulting from application of first clutch 6.

Accordingly, the first clutch transmitted torque capacity is set smaller when in the second mode than when in the first start mode, although both of the first and second start modes perform slip application of first clutch 6 by variably controlling the transmitted torque capacity of first clutch 6, and thereafter also apply second clutch 7 by variably controlling the transmitted torque capacity of second clutch 7.

Accordingly, in the second start mode, it is possible to suppress shocks caused by torque fluctuation resulting from application of first clutch 6. Namely, when the engine is started without driver's intention, it is possible to suppress torque fluctuation resulting from application of the first clutch, and thereby suppress the driver from feeling uncomfortable about shocks caused by the torque fluctuation.

Figure 7:
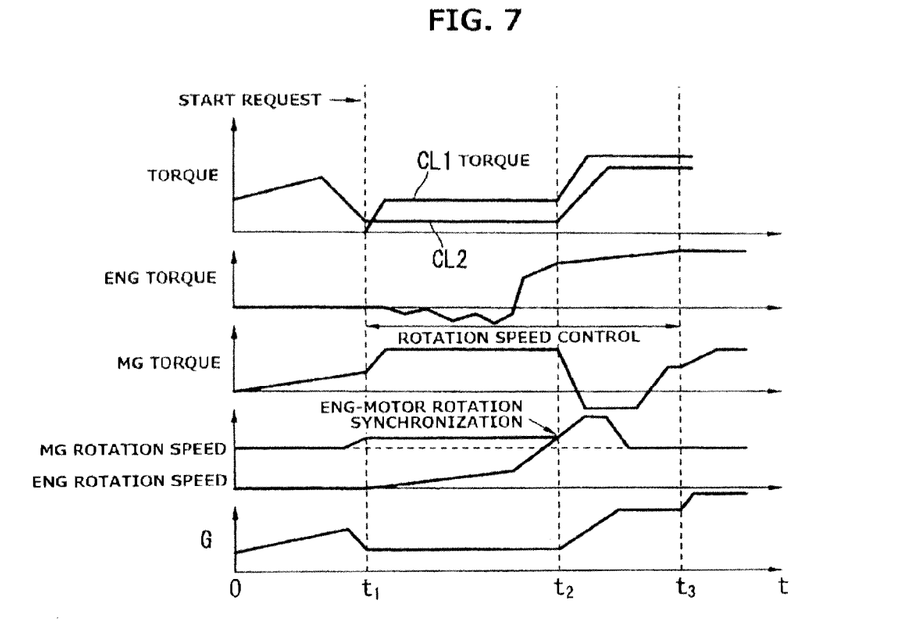
FIG. 7 is a time chart showing behavior of components when an engine 1 is started in the first start mode.
Figure 8:
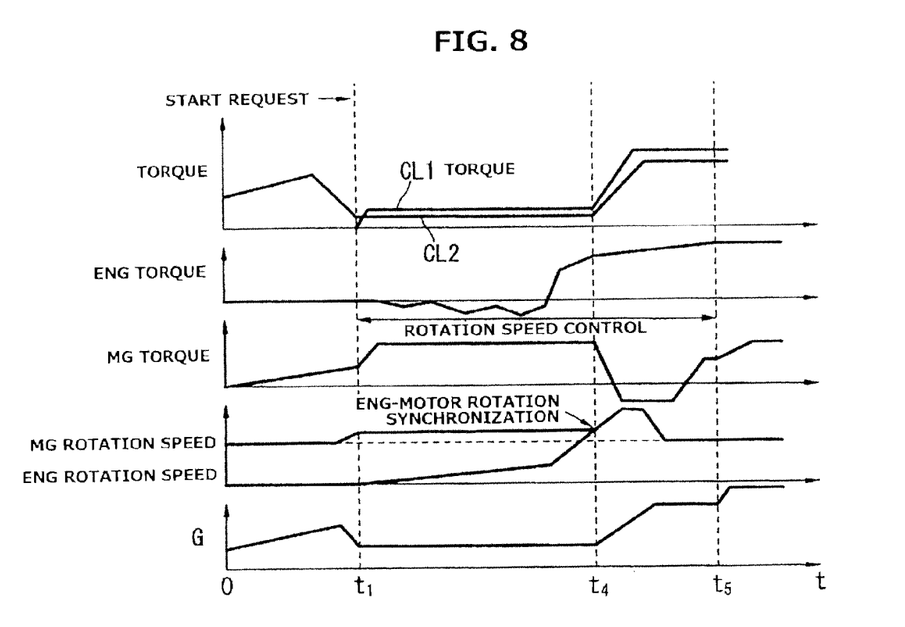
FIG. 8 is a time chart showing behavior of components when engine 1 is started in a second start mode.

FIG. 7 is an example of behavior of components when engine 1 is started from rest in the first start mode. FIG. 8 is an example of behavior of the components when engine 1 is started from rest in the second start mode.

When a request for starting engine 1 is issued, both in the first start mode and the second start mode, the target transmitted torque capacity tTc2 of second clutch 7 is reduced to a target value for cranking (at a time instant t1), and the target transmitted torque capacity tTc1 of first clutch 6 is increased from zero to a target value for cranking. The target transmitted torque capacity tTc2 of second clutch 7 during cranking is set to the same value in the first start mode and in the second start mode. When the rotation speed of engine 1 and the rotation speed of motor-generator 5 are synchronized with each other (at a time instant t2 in the first start mode, or at a time instant t4 in the second start mode), then the target transmitted torque capacity tTc1 of first clutch 6 and the target transmitted torque capacity tTc2 of second clutch 7 are increased to respective target values for post-cranking.

Incidentally, rotation speed control of motor-generator 5 is performed to conform the actual rotation speed to the target rotation speed after time instant t1 when cranking of engine 1 is started. This rotation speed control is continued until a time instant t3 in the first start mode, or until a time instant t5 in the second start mode. On the other hand, torque control of motor-generator 5 is performed to conform the output torque of motor-generator 5 to the target torque, before time instant t1, and after time instant t3 in the first start mode, and after time instant t5 in the second start mode.

As described above, the target transmitted torque capacity tTc1 of first clutch 6 during cranking is set smaller when in the second start mode shown in FIG. 8 than when in the first start mode shown in FIG. 7, thereby suppressing shift shocks caused by application of first clutch 6. The feature that the target transmitted torque capacity tTc1 of first clutch 6 during cranking is set smaller when in the second start mode than when in the first start mode, results in that it takes a longer time period to ignite engine 1 in the second start mode. Accordingly, the time period of cranking in the second start mode (the period from t1 to t4 in FIG. 8) is longer than the time period of cranking in the first start mode (the period from t1 to t2 in FIG. 7). The acceleration during cranking is constant both in the first start mode and in the second start mode.

Figure 9:
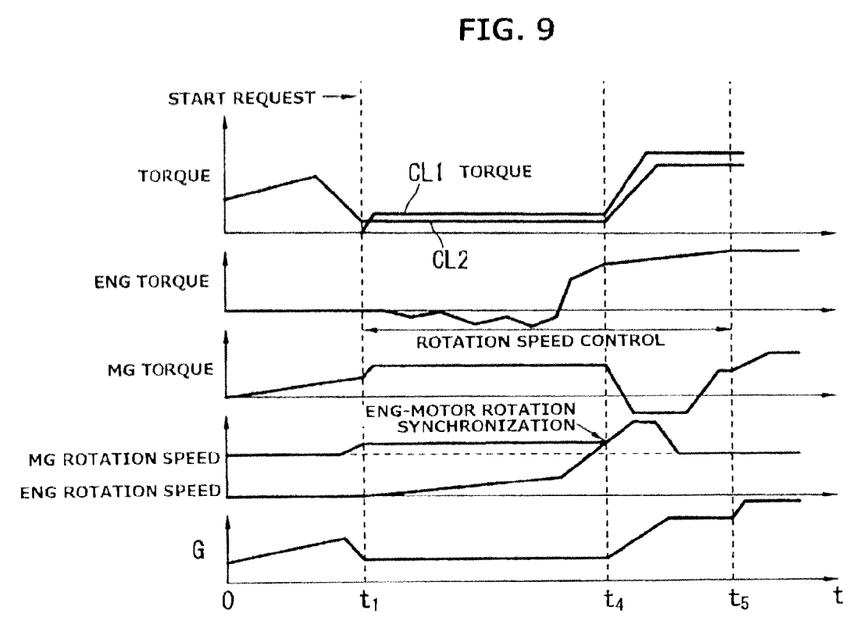
FIG. 9 is a time chart showing behavior of components when engine 1 is started in the second start mode under condition a motor torque of motor-generator 5 has decreased.

When the engine start in the second start mode is requested based on overheating of motor-generator 5 or decrease of the maximum possible output power of battery 9, the engine is started under a condition where the motor torque of motor-generator 5 is reduced as shown in FIG. 9. In such a situation, it is desirable to maintain a driving torque to driving road wheels 2. Accordingly, it is desirable to implement reduction of the target transmitted torque capacity tTc1 of first clutch 6 by reducing the target transmitted torque capacity tTc1 of first clutch 6 in accordance with decrease of the motor torque of motor-generator 5 while maintaining the target transmitted torque capacity tTc2 of second clutch 7 during cranking to the target value for cranking in the first start mode. This serves to set constant the torque transmitted to driving road wheels 2 during cranking of engine 1, and thereby suppress the driver from feeling uncomfortable about shocks resulting from torque fluctuation, even when the motor torque of motor-generator 5 is limited.

Incidentally, when engine start is requested while the vehicle is running on an ascending slope having a large gradient and engine 1 is at rest, then engine 1 is started in the second start mode. This is because at a large gradient, the output torque of motor-generator 5 gets large so that the torque for engine start is insufficient.

If torque fluctuation at application of first clutch 6 is large even with variable control of the transmitted torque capacity of second clutch 7 when engine start is requested, then engine 1 is started in the second start mode. This is because in cases where second clutch 7 is constituted by an existing friction member in automatic transmission 3 for selection of a forward gear position or by an existing friction member in automatic transmission 3 for selection of a reverse gear position, the contribution of input torque and clutch torque to output torque when a friction member constituting the second clutch 7 is slipping, varies among gear positions and friction members, so that it may be impossible to absorb torque fluctuation resulting from start of engine 1 if slip application of second clutch 7 is carried out under a constant condition.

The invention claimed is:

1. An engine start control apparatus for a hybrid electric vehicle, wherein:
   the hybrid electric vehicle is provided with an engine and a motor;
   the engine and the motor are connected to each other through a first clutch whose transmitted torque capacity is adjustable;
   the hybrid electric vehicle starts the engine by applying the first clutch and cranking the engine with a driving effort of the motor;
   the engine start control apparatus employs a first start mode and a second start mode;

the first start mode is a mode in which the engine start control apparatus starts the engine from rest in response to driver's accelerator operation;

the second start mode is a mode in which the engine start control apparatus starts the engine from rest in response to a factor other than driver's accelerator operation;

the engine start control apparatus sets smaller the transmitted torque capacity of the first clutch during cranking of the engine when in the second start mode than when in the first start mode;

the engine start control apparatus starts the engine in the second start mode, in response to a condition that a maximum possible motor torque outputted from the motor decreases below a predetermined value while the engine is at rest; and the engine start control apparatus performs a process while starting the engine in the second start mode in response to the condition, wherein the process includes:

setting a driving torque transmitted to a driving wheel during cranking such that the driving torque is equal to a driving torque transmitted to the driving wheel during cranking in the first start mode; and setting the transmitted torque capacity of the first clutch during cranking of the engine such that the transmitted torque capacity of the first clutch during cranking of the engine decreases in accordance with the maximum possible motor torque.

* * * * *